United States Patent
Hoene et al.

(10) Patent No.: US 12,288,083 B2
(45) Date of Patent: Apr. 29, 2025

(54) SYSTEM AND METHOD FOR COMMUNICATION BETWEEN A WEB-BASED APPLICATION AND A COMPUTATION INTENSIVE EXECUTABLE

(71) Applicant: Dassault Systemes Americas Corp., Waltham, MA (US)

(72) Inventors: John Hoene, Eagan, MN (US); Joseph Miller, Eagan, MN (US); Steven Deziel, Eagan, MN (US); Paul Meyer, Eagan, MN (US)

(73) Assignee: Dassault Systemes Americas Corp., Waltham, MA (US)

( * ) Notice: Subject to any disclaimer, the term of this patent is extended or adjusted under 35 U.S.C. 154(b) by 165 days.

(21) Appl. No.: 18/147,897

(22) Filed: Dec. 29, 2022

(65) Prior Publication Data
US 2024/0220283 A1    Jul. 4, 2024

(51) Int. Cl.
*G06F 9/445* (2018.01)
*G06F 9/54* (2006.01)

(52) U.S. Cl.
CPC .......... *G06F 9/44521* (2013.01); *G06F 9/546* (2013.01); *G06F 9/547* (2013.01)

(58) Field of Classification Search
CPC ....... G06F 9/44521; G06F 9/546; G06F 9/547
See application file for complete search history.

(56) References Cited

U.S. PATENT DOCUMENTS

| | | | |
|---|---|---|---|
| 2002/0103906 A1* | 8/2002 | Knight | H04L 67/02 709/225 |
| 2007/0226314 A1* | 9/2007 | Eick | G06F 16/986 709/217 |
| 2010/0138485 A1* | 6/2010 | Chow | H04L 67/01 711/E12.017 |
| 2015/0067819 A1* | 3/2015 | Shribman | H04L 65/612 709/218 |
| 2016/0337426 A1* | 11/2016 | Shribman | H04N 21/6125 |

OTHER PUBLICATIONS

European Search Report for Application #23219813.5 dated May 31, 2024.

(Continued)

*Primary Examiner* — Phillip H Nguyen
(74) *Attorney, Agent, or Firm* — Sheehan Phinney Bass & Green PA

(57) ABSTRACT

A system and method provide access by a web application running on a host computing device in communication with a remote server to a native binary DLL. A browser extension to the web application and a native messaging application communicate with the browser extension via standard input/output. A long-running computational process on the host computing device configured as a wrapper for the binary DLL is executable by the host computing device. The native messaging application and the long-running computational process communicate with one another via a named pipe, and the long-running computational process duration is independent of the native messaging application duration.

13 Claims, 13 Drawing Sheets

(56) References Cited

OTHER PUBLICATIONS

Anonymous; Javascript—Calling a C dll through Chrome browser extension—Stack Overflow, May 23, 2017, pp. 1-5 retrieved from the Internet: https://stackoverflow.com/questions/33593261/calling-a-c-dll-through-chrome-brow ser-extension [retrieved on May 17, 2024].

Anonymous; Native messaging—Google Chrome (wayback machine version of May 9, 2015; Retrieved from the Internet: URL:https://web.archive.org/web/20150905114332/https://developer.chrome.com/extensions/nativeMessaging [retrieved on May 17, 2024].

* cited by examiner

SYSTEM AND METHOD FOR COMMUNICATION BETWEEN A WEB-BASED APPLICATION AND A COMPUTATION INTENSIVE EXECUTABLE

FIELD OF THE INVENTION

The present invention relates to intra-application communications in a computer system, and more particularly, is related to web based application access to a local data and/or processor intensive application.

BACKGROUND OF THE INVENTION

The processing load for a typical web based applications may share between a (local) client hosted application, and a (remote) server, where the client hosted application typically performs low processor-intensive tasks and transfers data to the server for higher processor-intensive tasks. Typically, the client hosted application runs on a personal computer, tablet, smart phone, or other similar device, and communicates with the server via a network connection. For example, the server may be a cloud-based server. Certain types of web based applications involve transfer and processing of a large amount of data between the local client device and the remote server. For example, a web based augmented reality application may control a camera producing high volume and bandwidth data.

Typically, for web applications the server processes requests for high bandwidth/processor intensive tasks from the local client, while the client device processes low-bandwidth and low processor-intensive tasks locally tasks, for example, via a JavaScript application. However, some locally hosted applications, for example, a high-volume image data application that transfers upwards of 100 Kb or data per second, require more data bandwidth and transfer time to the server and would not scale for processing, but processing with JavaScript would be too slow. While the client may have sufficient processing power to host local executables capable of handling the high-volume image data, such local executables have heretofore not been reliably accessible by web applications. Further, in general, it is considered a security risk for a web application to access an executable on the host computer. For example, JavaScript cannot access binary dynamic link library (DLL) files. Therefore, there is a need in the industry to address these shortcomings.

SUMMARY OF THE INVENTION

Embodiments of the present invention provide a system and method for communication between a web-based application and a computationally intensive executable. Briefly described, the present invention is directed to a system and method providing access by a web application running on a host computing device in communication with a remote server to a native binary DLL. A browser extension to the web application and a native messaging application communicate with the browser extension via standard input/output. A long-running computational process on the host computing device configured as a wrapper for the binary DLL is executable by the host computing device. The native messaging application and the long-running computational process communicate with one another via a named pipe, and the long-running computational process duration is independent of the native messaging application duration.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The components in the drawings are not necessarily to scale, emphasis instead being placed upon clearly illustrating the principles of the present invention. The drawings illustrate embodiments of the invention and, together with the description, serve to explain the principles of the invention.

DETAILED DESCRIPTION

Figure 1:
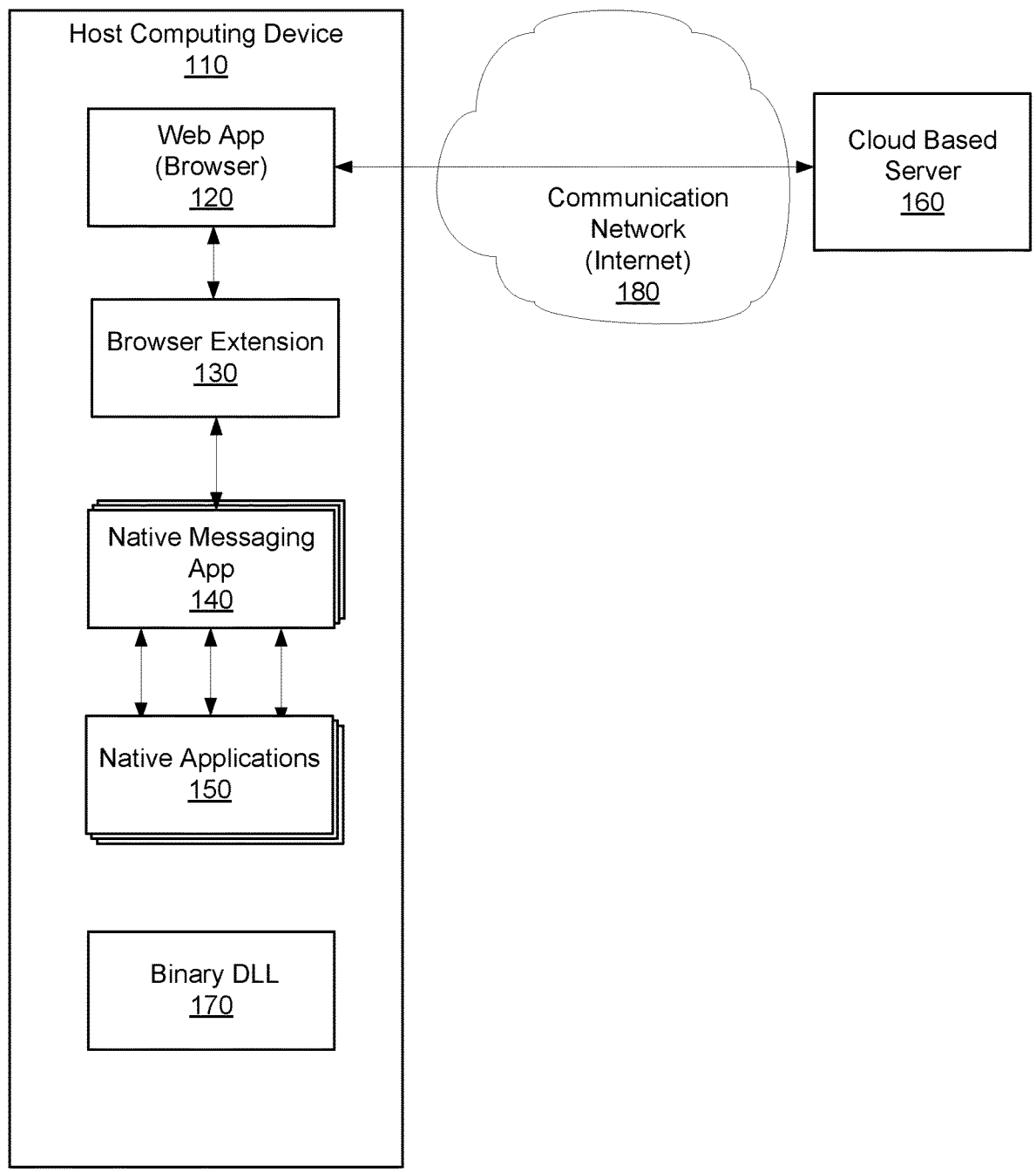
FIG. 1 is a schematic block diagram of a computing device hosting a web application in communication with a cloud based server.

The following definitions are useful for interpreting terms applied to features of the embodiments disclosed herein, and are meant only to define elements within the disclosure.

As used within this disclosure, a "host computing device" refers to a computing device such as a personal computer, a tablet computer, a smart phone, among others, that hosts a web application.

As used within this disclosure "local" refers to a host computing device running (executing) a computationally intensive process.

As used within this disclosure, a "computationally and/or data intensive process" refers to a process that uses, for example, more than 20% of the computational capacity of the host computing device. Examples of this type of process are real time image processing of a video stream and real time data collection of temperatures, pressures, and reactions in a high speed process. Qualitatively, a computationally and/or data intensive process is one that is better suited to be executed in code developed for the native processor of the host computing device rather than in cross-platform code (for example JavaScript) executed by a web-application or extension.

As used within this disclosure, a "web application" refers to a software application running on or accessed by the host computing device that provides a user interface for a user of the host computing device to a remote application (for example, a web browser) running on one or more remote servers. For example, the remote servers may be cloud based servers that communicate with the web application via a communication network, such as the internet.

As used within this disclosure, a "browser extension" (also referred to as a web extension or a plug-in) refers to a unit of software that may perform various functions to change the way a user might interact with a web application. A browser extension may have privileges to access functionalities of the host computing device that are otherwise unavailable to the web application, for example, via the operating system of the host computing device.

As used within this disclosure a "native application" refers to a software program that is developed for use on a particular platform or device. Because a native app is built for use on a particular device and its OS, it has the ability to use device-specific hardware and software. Native apps can provide optimized performance and may leverage resources specific to the hosting device, in contrast with web apps or mobile cloud apps developed to be generic across multiple systems. In the context of mobile web apps, the term native app is used to mean any application written to work on a specific device platform.

As used within this disclosure, a "native messaging app" refers to an application running on a client device providing native messaging in the context of the host computing device. Native messaging enables a web application extension to exchange messages with a native application installed on the host computing device. The native messaging serves the extensions without additional accesses over the web. Native messaging may enable extensions to access resources that are not accessible through Web Extension APIs (e.g., specific hardware). The native application is not installed or managed by the web application (browser). The native application is installed using the underlying installation machinery of the operating system of the host computing device. The native messaging app restricts message access to specific web applications (browser extension) that have been granted permission. However, the native messaging apps for example, such as the Skype meeting launcher, are typically limited in their scope and duration, for example, existing only long enough to support a specific transaction with a native application. As another example, a native messaging app may terminate ("time-out") after a predefined period of inactivity.

As used within this application, a "named pipe" refers to a conduit for inter-process communication (IPC). A named pipe (also known as a FIFO (first in, first out) as per its behavior) is an extension to the traditional pipe concept on Unix and Unix-like systems, and named pipes are also found in other computer operating systems although the semantics may differ substantially. A traditional pipe is "unnamed" and lasts only as long as the process that creates it. A named pipe, however, can last as long as the system is running, beyond the life of the process that created it. The named pipe provides bidirectional communication between two endpoints. A named pipe can be deleted if no longer used. Usually a named pipe appears (e.g., via a user interface) as a file, and generally processes attach to a named pipe for IPC. A named pipe can be used to transfer information from one application to another without the use of an intermediate temporary file. The exact name of the named pipe must be known to access the named pipe, which may be leveraged as a security feature. For example, a named pipe may be used for multiple listeners to a database server. Here, each listener receives multiple connections and is responsible for passing the requests to the database engine (which is a separate process on the same machine). The messaging app passes these requests from the listener process to the engine process using named pipes.

As used within this disclosure, a "duration" of an application or process refers to a time interval beginning at a first time when the application or process is launched and ending at a second time when the application or process terminates.

As used within this disclosure, a "long-running process" refers to a native application, for example, created by a native messaging app, that may persist after the native messaging app has terminated, for example, due to a time-out for lack of use. For example, the long-running process created during a user session on the target computing device may persist until the user session ends (e.g., the user logs out). Here, the long-running process is used to perform the processor intensive data processing on the host computing device, rather than on the server. For example, the long-running process may serve as a shell to execute a binary DLL that cannot be directly executed by the browser extension. In particular, the duration of a long-running process is independent of the duration of a native messaging application, and in general, the duration of the long-running process may typically be longer than the duration of the native messaging application. In the embodiments described herein, the executable for the long running process is responsible for the creation of the named pipe.

As used within this disclosure, "standard input/output means" refers to one or more of a plurality of mechanisms provided by an operating system of the host computing device providing for input and/or output of data for an entity recognized by the operating system. For example, the stdio.h header file in the C language may provide access to a suite of functions providing input and/or output functions, for example, printf( ), scanf( ), getc( ), gets( ), getchar( ), puts( ), among others.

As used within this disclosure, a "web application widget" is a software component that may be added to a website or application as a stand-alone feature.

Reference will now be made in detail to embodiments of the present invention, examples of which are illustrated in the accompanying drawings. Wherever possible, the same reference numbers are used in the drawings and the description to refer to the same or like parts.

Exemplary embodiments of the present invention are directed to methods and systems providing a web application access to native binary DLL via a long-running process in a computing device via a web based application. For example, the web application may be a web browser that needs to access local hardware, such as a camera, on a host device.

Web applications are not well suited for performing computationally intensive tasks. Since JavaScript and web applications in general cannot access a binary DLL, web applications typically may only access specific secure mechanisms on the host computer, for example, via browser extensions, which may interact with a native messaging app. The exemplary embodiments address the problem of providing a web application previously unavailable access to and/or control of a native binary DLL.

As shown by FIG. 1, a web application 120 running in a browser on a host computing device 110, such as a personal computer, a tablet computer, or a smartphone, amongst others. The web application 120 is served from a server typically cloud based 160 via a communications network link 180. The web application 120 generally serves as a user interface between the user of the host computing device and an application hosted by a cloud based server 160, where the cloud based server 160 communicates with the web application 120 via a communication network 180, for example, the internet. The web application 120 may typically be based on JavaScript. The web application 120 may access facilities of the host computing device 110 via browser extensions 130, where the web application 120 communicates with the browser extension 130 using JavaScript and the browser extension communicates with a native messaging application (app) 140 via standard input/output (STD IO) provided by an operating system of the host computing device 110. Using this chain, the web application may exchange information with one or more native applications 150 via one or more native messaging applications 140. However, as described in the background section, the native messaging applications 140 are limited to short duration, low data transactional communications. Further, the native messaging applications 140 do not provide a communications conduit between the web application and a native binary DLL 170.

Figure 2:
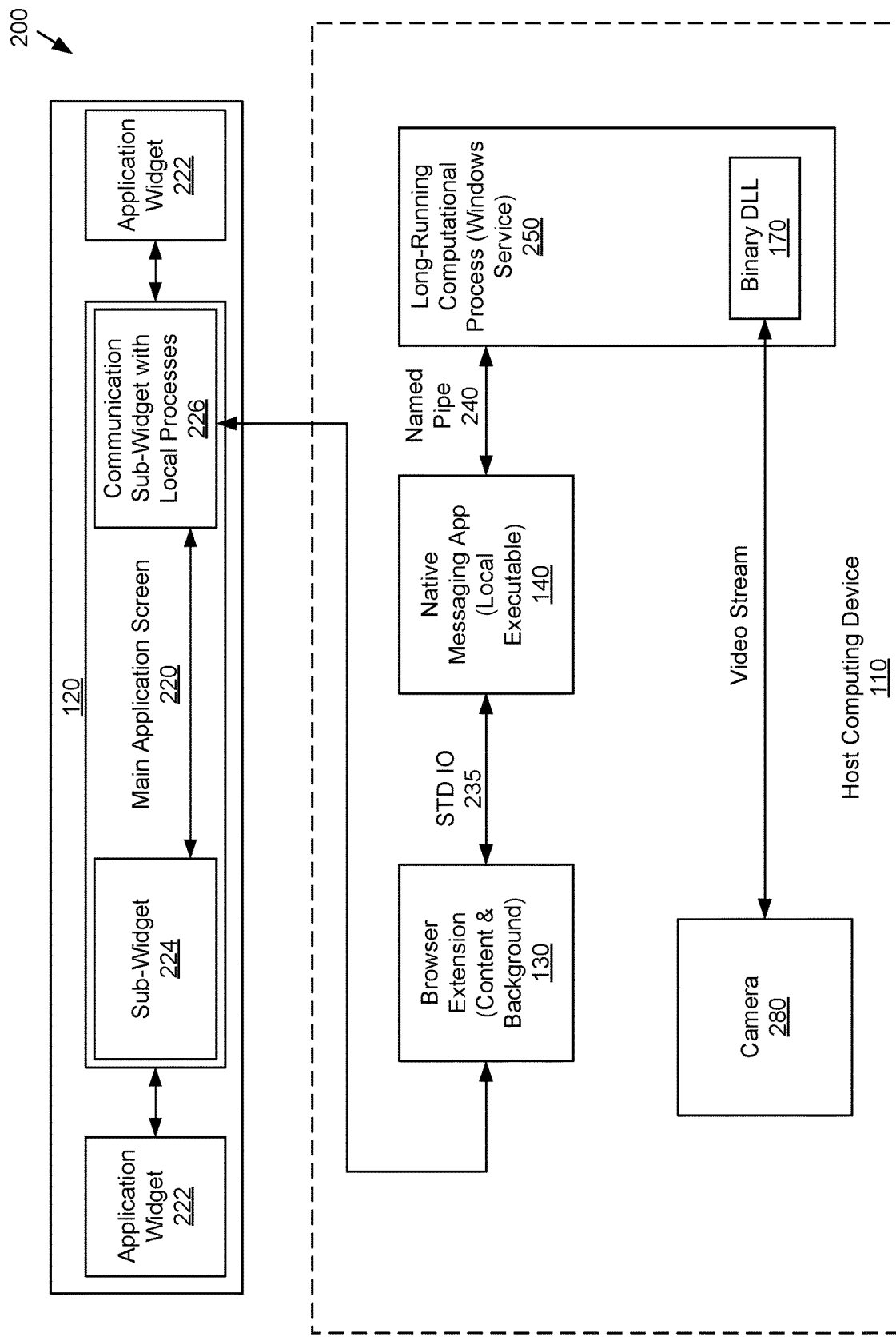
FIG. 2 is a block diagram of a first exemplary system embodiment providing web-application control of a data intensive application.

FIG. 2 is a block diagram of a first exemplary system embodiment of a system 200 providing web-application control of a data intensive application. The web application (browser) 120 generally includes a main application screen 220, and one or more application widgets 222. Application widgets are subcomponents of a larger web application that perform a specific task for example, but not limited to graph display, video display, or data display. The main application screen 220 provides user access to one or more sub-widgets 224. One or more sub-widgets 226 may involve communication with one or more local sub-processes, for example, via the browser extension 130. The browser extension 130 communicates with the native messaging app 140 via standard input/output provided by the operating system of the local device 110. The messaging app is an executable local to the (local) host computing device 110. A long-running computational process 250, for example, a Windows service, may encapsulate one or more binary DLLs 170. As noted previously, the web application 120, the browser extension 130, and the native messaging app 240 cannot directly access a binary DLL 170. Under the first embodiment, the binary DLL 170 is configured to communicate with and/or control a camera 280. However, in alternative embodiments, the binary DLL may involve other high data bandwidth and/or processor intensive tasks, for example, involving mathematical computations (such as crypto-currency farming, among other applications). Here, the camera 280 may provide a high bandwidth video stream to the binary DLL 170, and the binary DLL may provide control and/or configuration commands to the camera. The messaging app 140 and the long-running application 250 communicates via a named pipe 240.

Figure 3A:
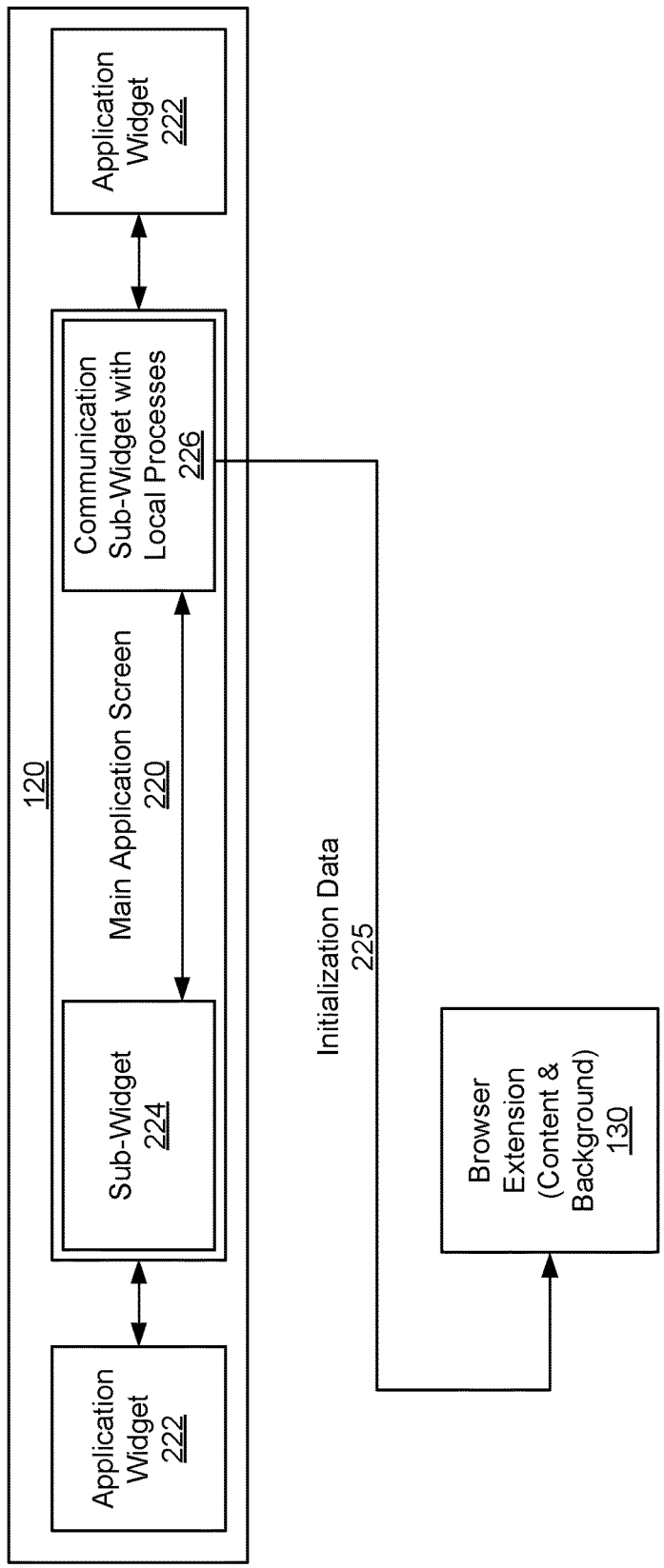
FIG. 3A is a block diagram of a first initialization step of the first exemplary system embodiment of FIG. 2.
Figure 3B:
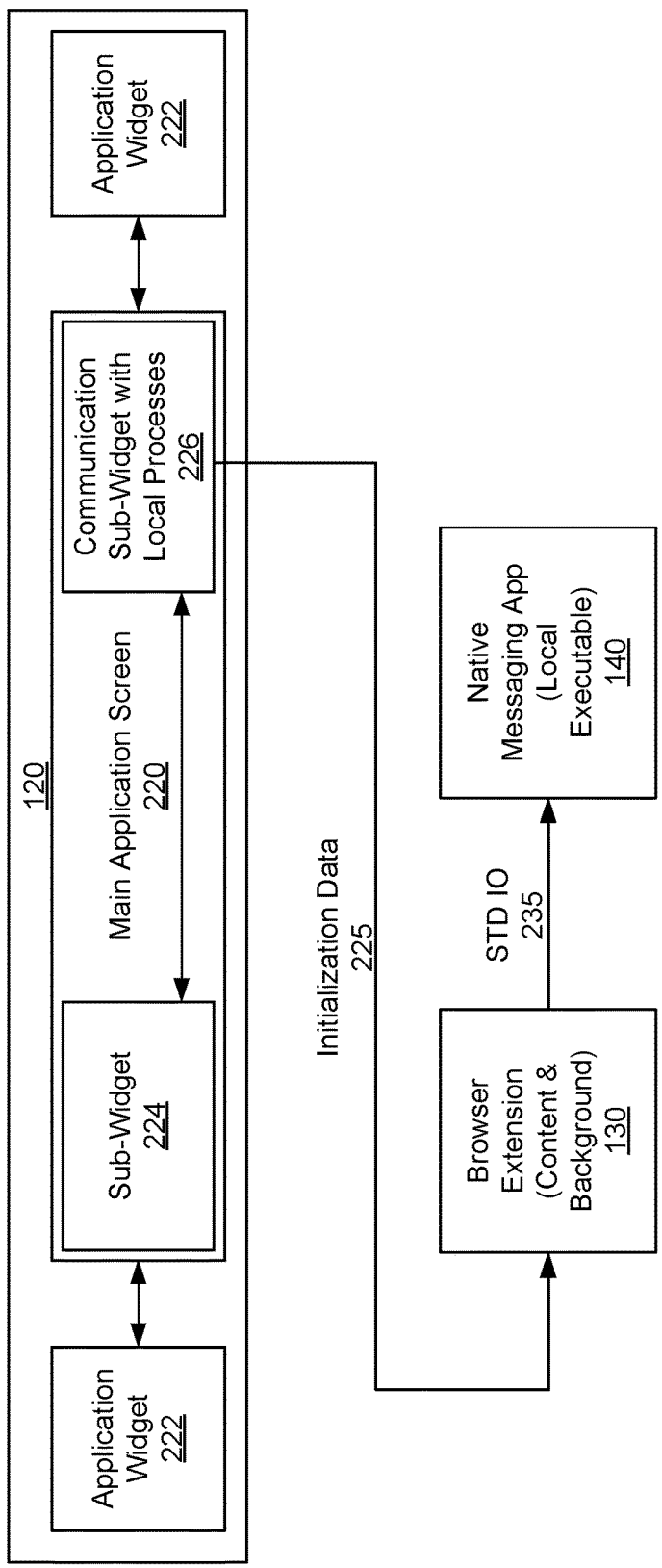
FIG. 3B is a block diagram of a second initialization step of the first exemplary system embodiment of FIG. 2.
Figure 3C:
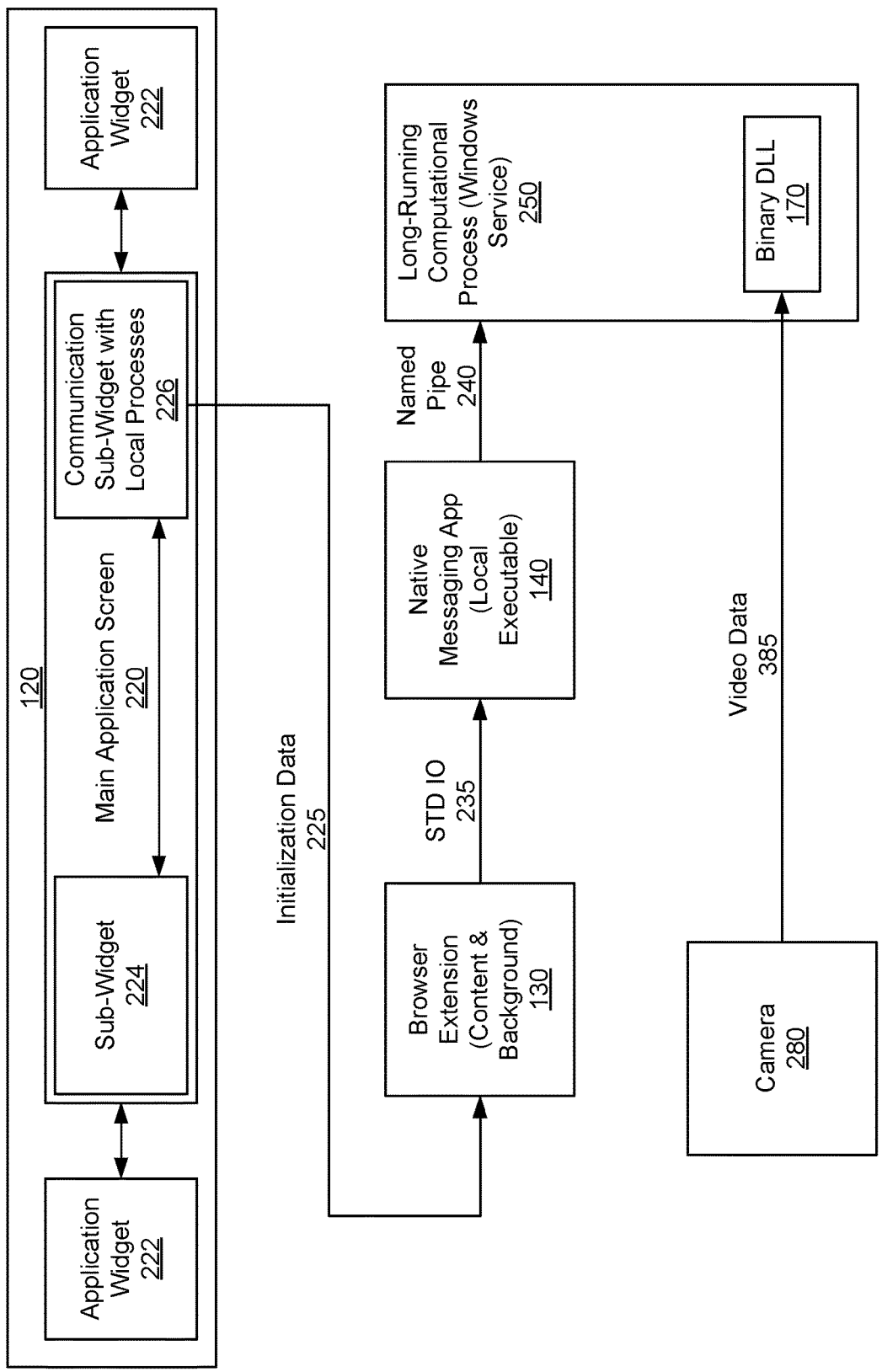
FIG. 3C is a block diagram of a second initialization step of the third exemplary system embodiment of FIG. 2.
Figure 4:
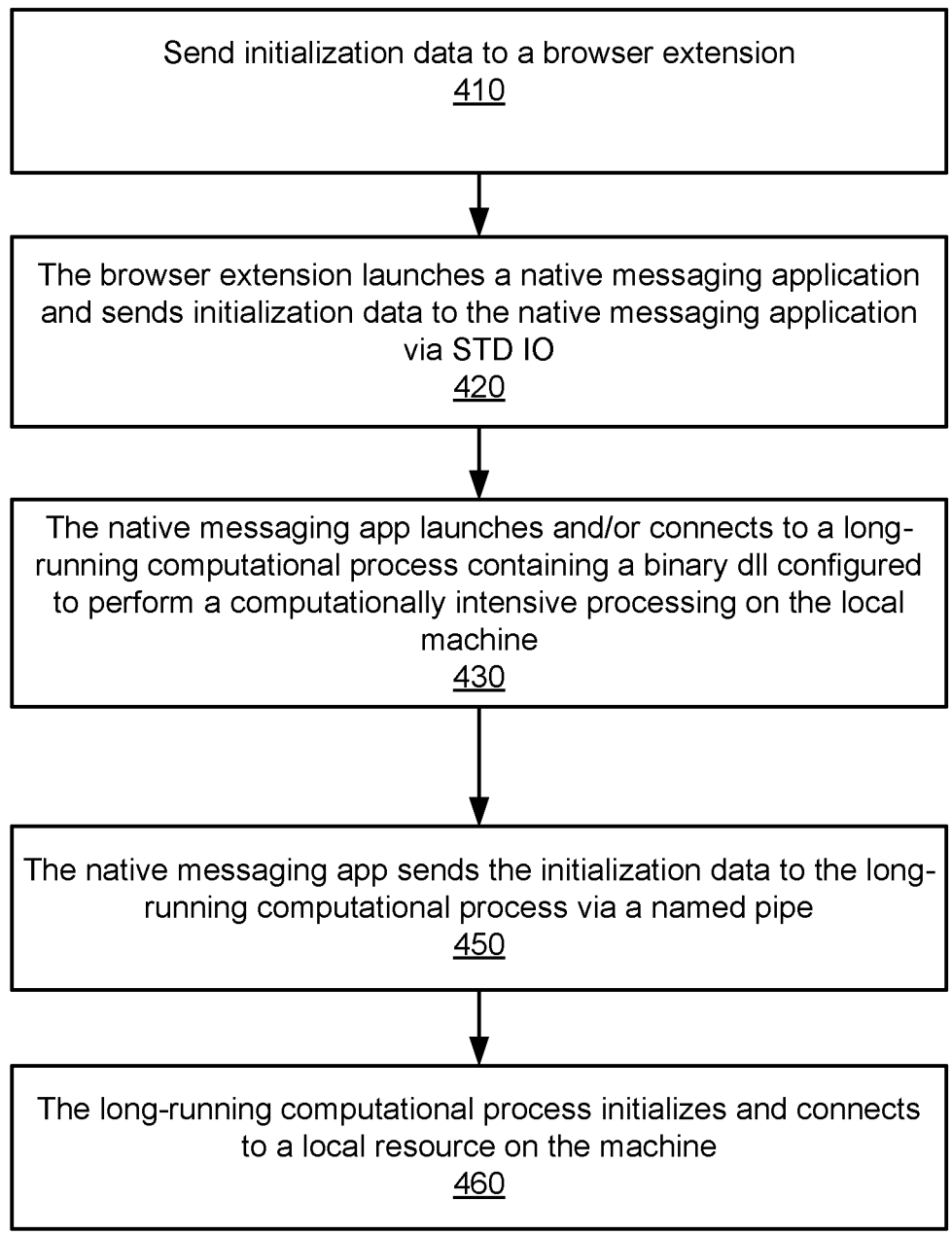
FIG. 4 is a flowchart of a first exemplary method for initializing the system of FIG. 2.

FIG. 4 is a flow-chart of a first exemplary method 400 for initializing a system providing access by a web application to a local native binary DLL. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention. The method is described with reference to FIGS. 3A-3C.

The communication sub-widget 226 sends initialization data 225 to the browser extension 130, as shown by block 410 and FIG. 3A. The browser extension 130 uses STD IO (standard input/output) 235 via a background process script, which is part of a browser extension, to launch a native messaging application 140 and send the initialization data to the native messaging application 140, as shown by block 420 and FIG. 3B. This step can be performed many times as the objects are stateless. The native messaging application 140 may be a local executable on the host computing device 110 (FIG. 1). As noted in the Background section, the native messaging app 140 may be of limited duration. The native messaging app does stay active for the duration of a transaction.

The native messaging app starts and/or connects to a long-running computational process 250 containing a binary DLL 170 configured to perform a computationally intensive process on the local machine, as shown by block 430 and FIG. 3C. For example, the long-running computational process 250 may be a Windows service, the binary DLL may be a windows DLL, and the computationally intensive process may be video or statistical analysis, among others. The native messaging app 140 sends the initialization data to the long-running computational process 250 via the named pipe 240, as shown by block 450. The long running process 250 is responsible for the creation of the named pipe. The long-running computational process 250 initializes and connects to a local resource 280 (such as a camera) on the machine via the binary DLL 170, as shown by block 460.

Figure 5A:
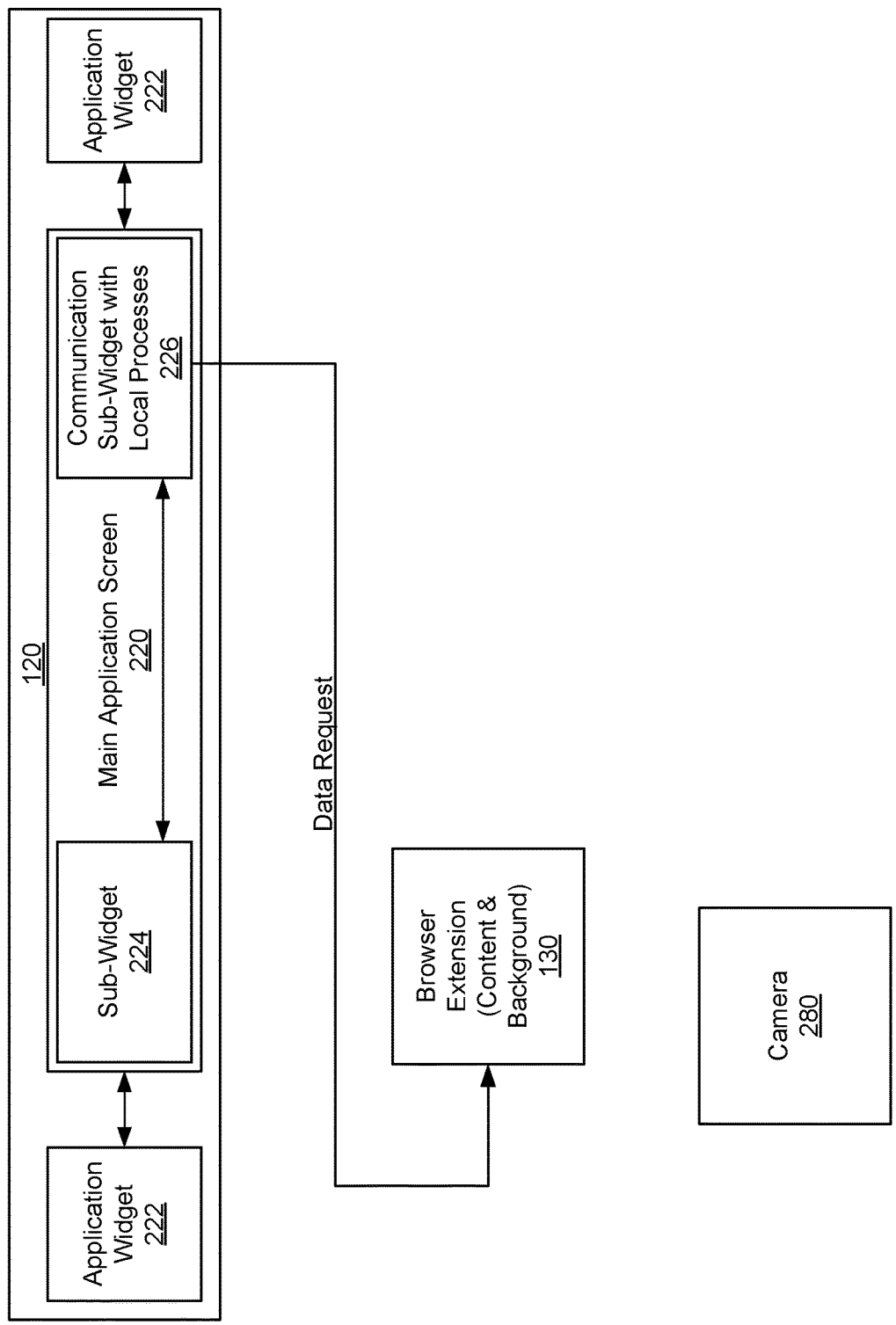
FIG. 5A is a block diagram of a first communication step of the first exemplary system embodiment of FIG. 2.
Figure 5B:
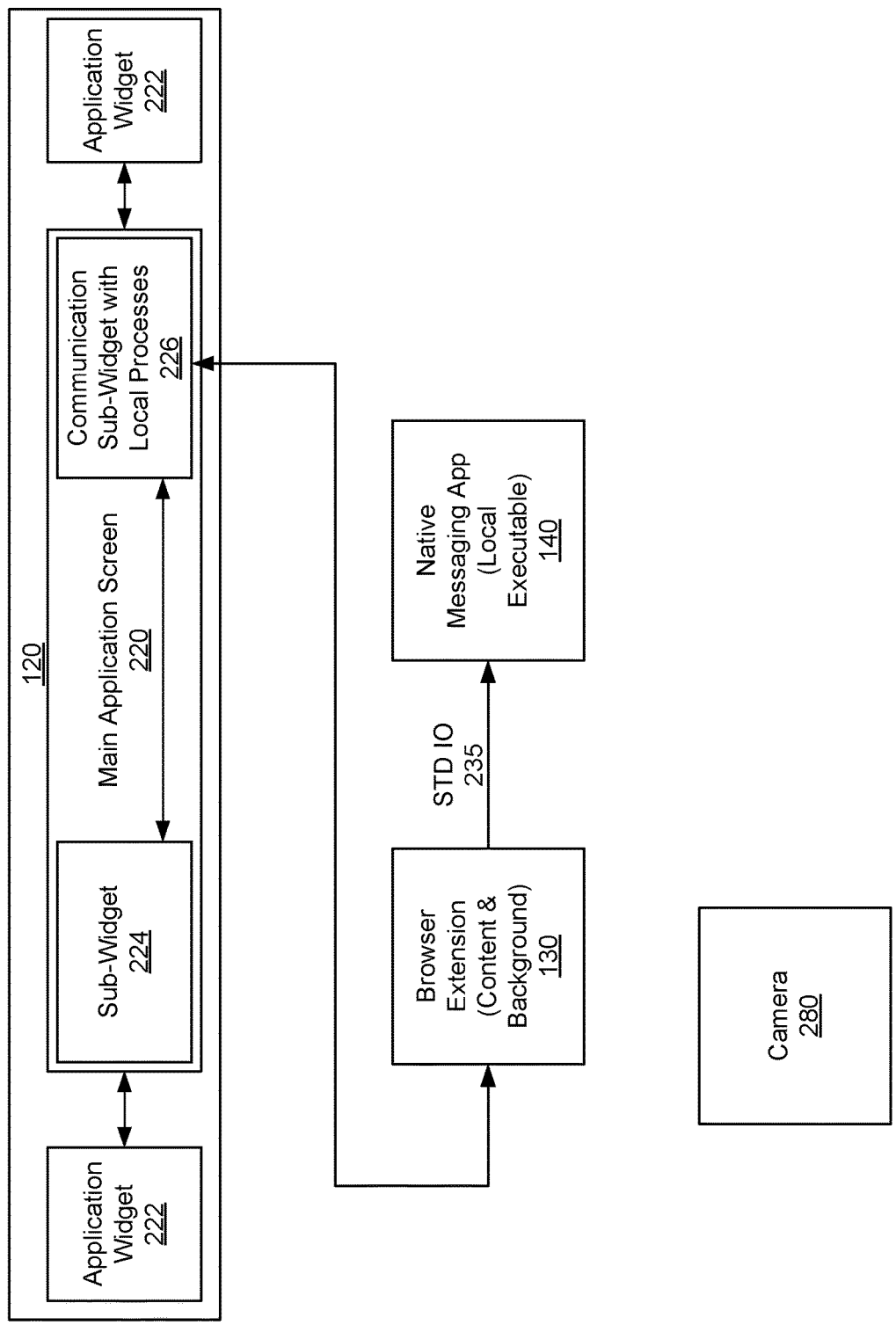
FIG. 5B is a block diagram of a second communication step of the first exemplary system embodiment of FIG. 2.
Figure 5C:
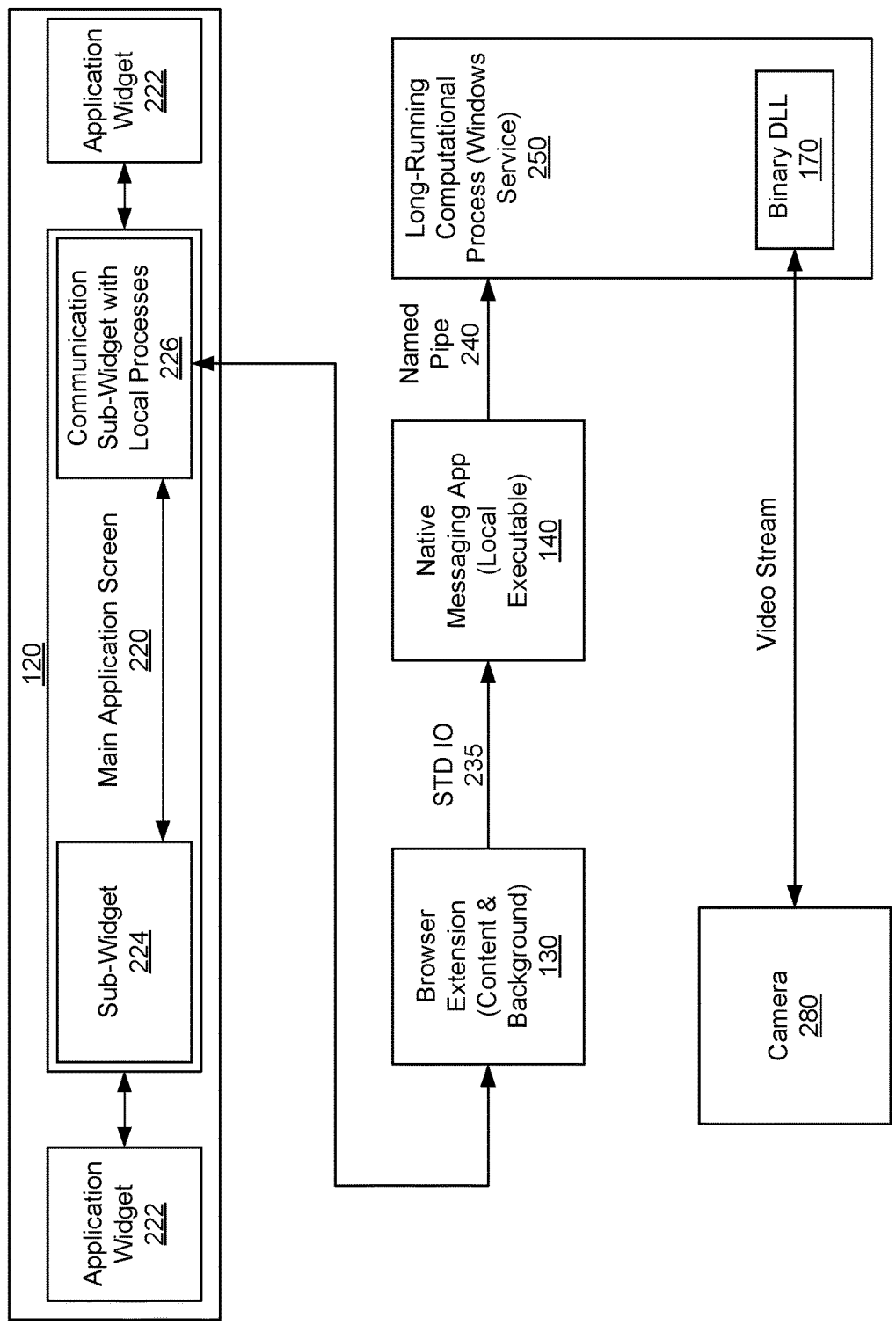
FIG. 5C is a block diagram of a third communication step of the first exemplary system embodiment of FIG. 2.
Figure 5D:
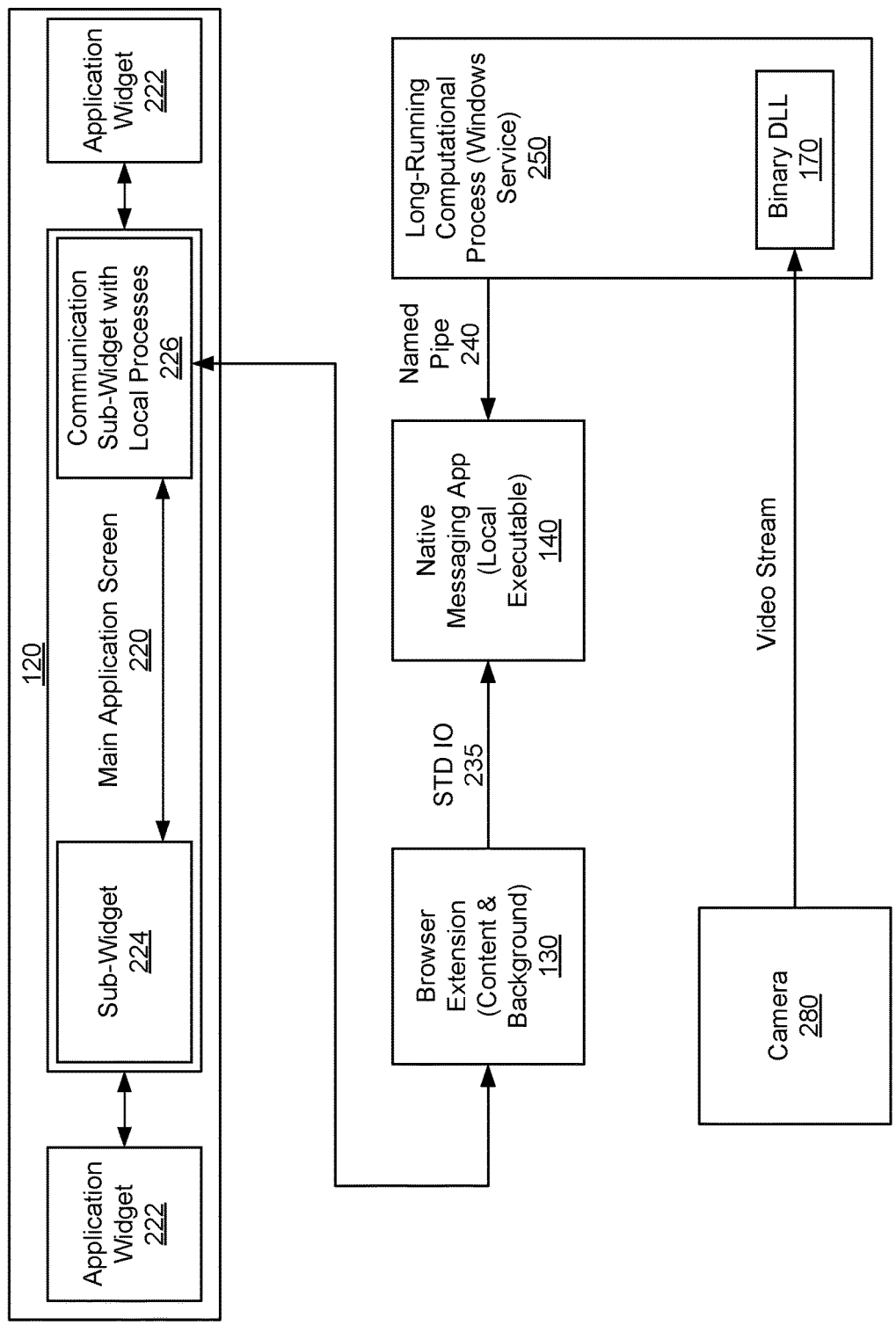
FIG. 5D is a block diagram of a fourth communication step of the first exemplary system embodiment of FIG. 2.
Figure 5E:
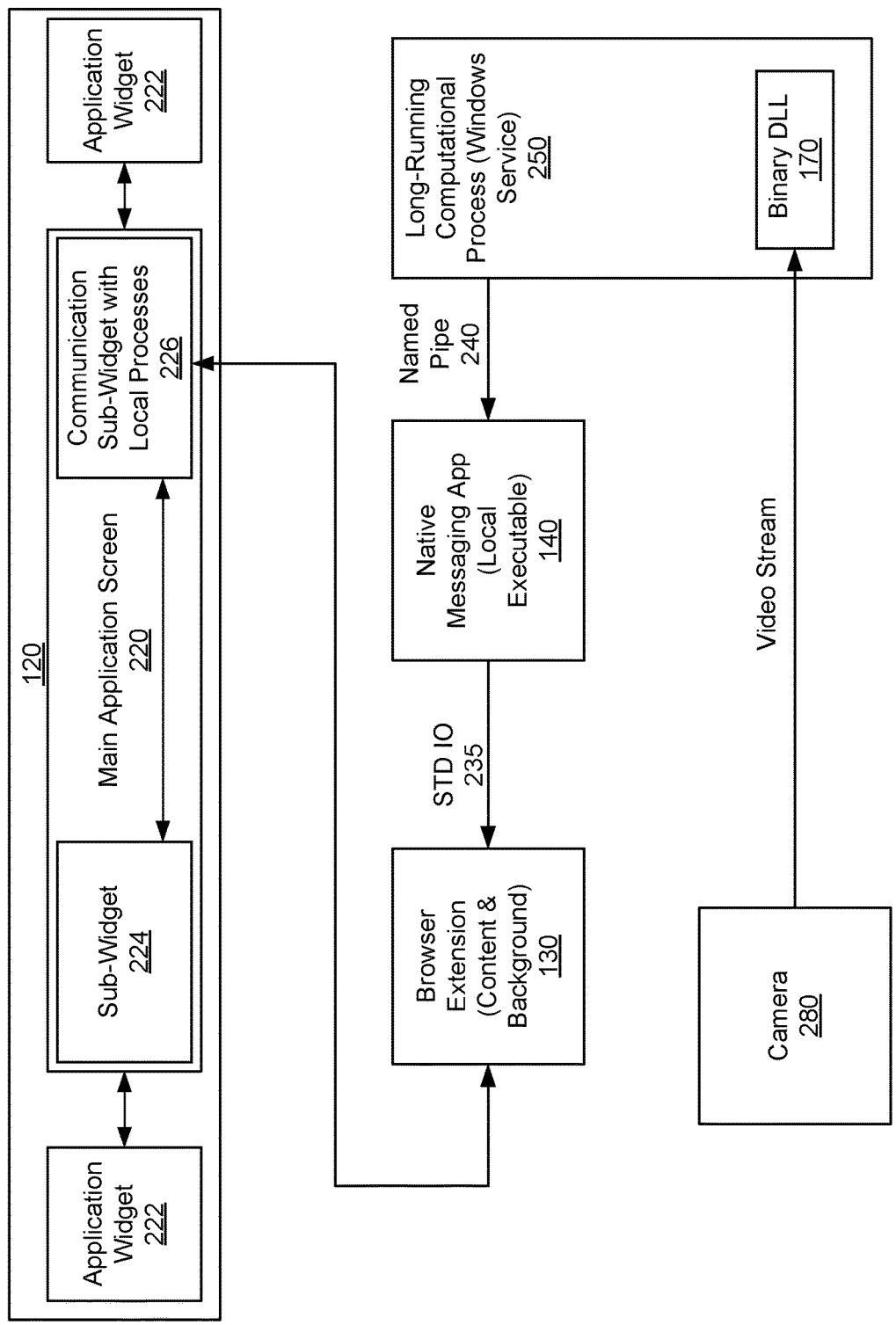
FIG. 5E is a block diagram of a fifth communication step of the first exemplary system embodiment of FIG. 2.
Figure 6:
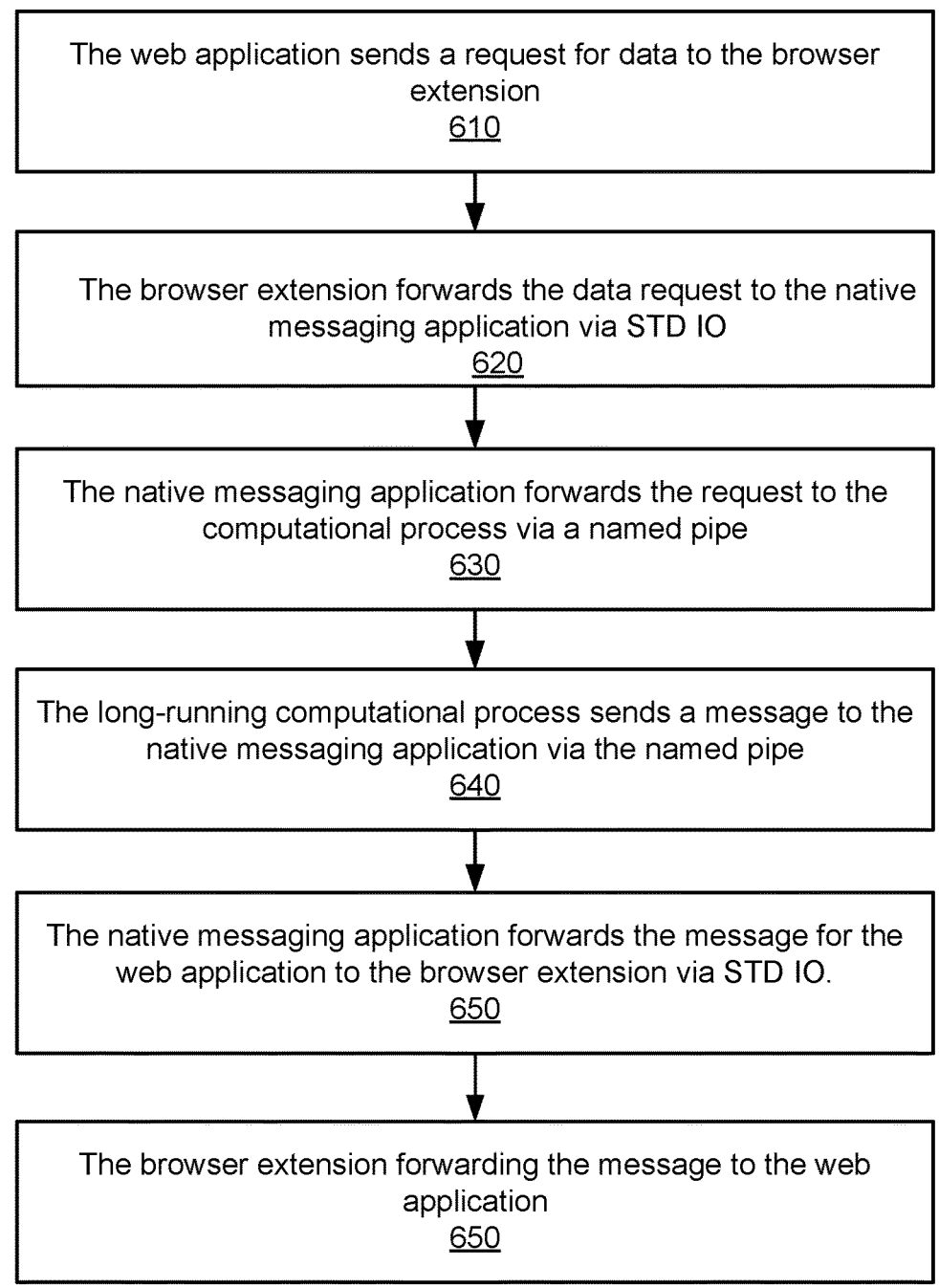
FIG. 6 is a flowchart of a second exemplary method for communicating via the system of FIG. 2.

FIG. 6 is a flow-chart of a second exemplary method 600 for communicating using a system providing access by a web application to a local native binary DLL. The method is described with reference to FIGS. 5A-5E.

The web application 120 sends a request for data to the browser extension 130, for example, using a click event, as shown by block 610 and FIG. 5A. The data requested is to be provided by the computational process 250, however, as noted, the web application 120 cannot communicate directly with the computational process 250. The browser extension 130 uses STD IO 235 to send the data request to the native messaging application 140, as shown by block 620 and FIG. 5B. The native messaging application 140 sends the request to the computational process 250 via the named pipe 240, as shown by block 630 and FIG. 5C.

On a continuous basis, the long-running computational process 250 uses local resources such as the camera 280 to perform complex algorithms that are too computationally demanding for a browser based application. Examples of a complex computational process include video stream analysis, real time data collection, statistical analysis, and bit coin mining, among others.

The long-running computational process 250 sends processed result data and status to the native messaging application 140 via the named pipe 240, as shown by block 640 and FIG. 5D. The native messaging application 140 uses STD IO 235 to send processed result data and status to the browser extension 130, as shown as shown by block 650 and FIG. 5E. The browser extension 130 sends processed result data and status to the web application 220, as shown by block 660. Data is exchanged between various parts of the application as needed, for example, to support the normal and continuous operation of the camera 280.

Figure 7:
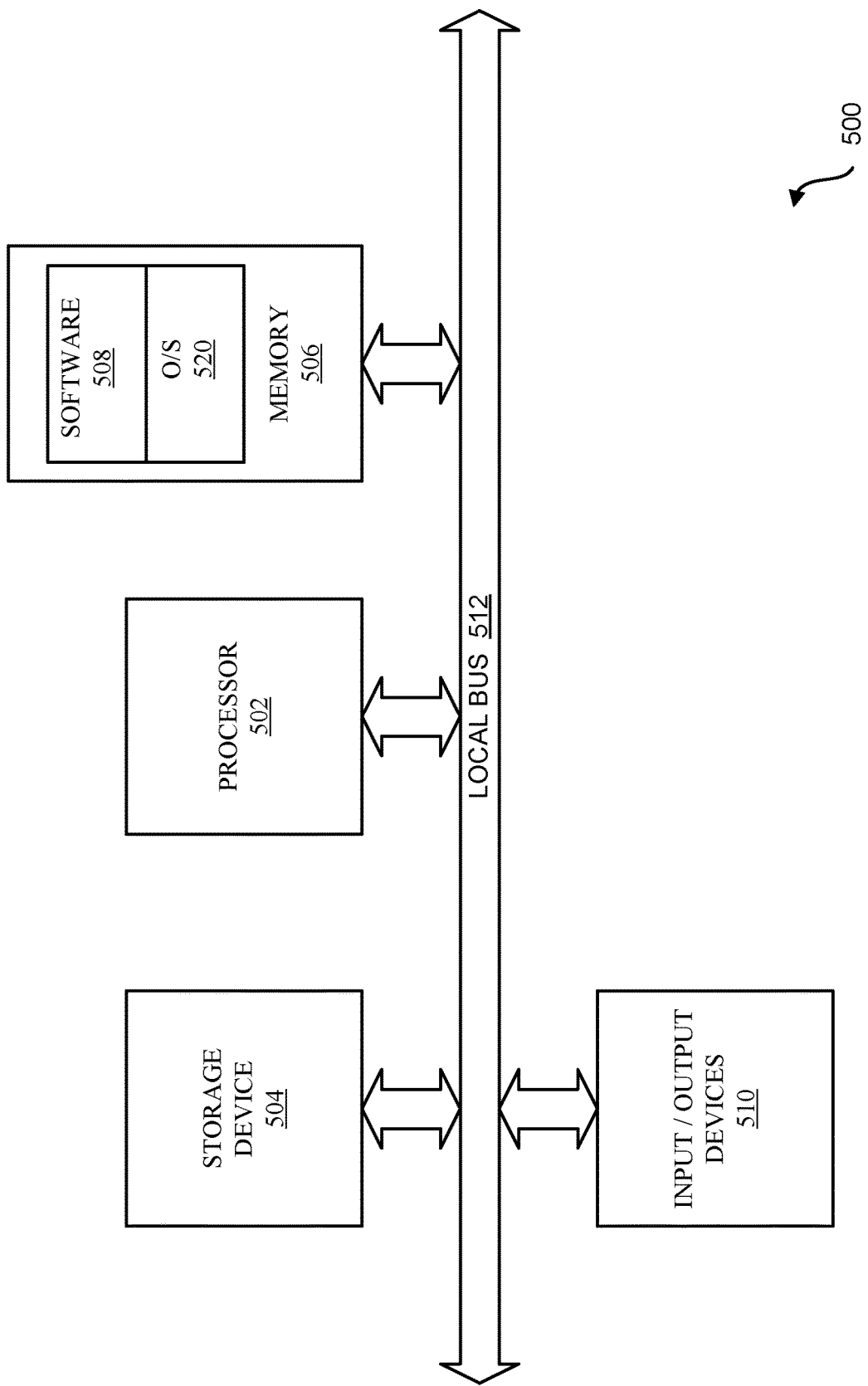
FIG. 7 is a schematic diagram illustrating an example of a system for executing functionality of the present invention.

As previously mentioned, the present system for executing the functionality described in detail above may be a computer, an example of which is shown in the schematic diagram of FIG. 7. The system 500 contains a processor 502, a storage device 504, a memory 506 having software 508 stored therein that defines the abovementioned functionality, input, and output (I/O) devices 510 (or peripherals), and a local bus, or local interface 512 allowing for communication within the system 500. The local interface 512 can be, for example but not limited to, one or more buses or other wired or wireless connections, as is known in the art. The local interface 512 may have additional elements, which are omitted for simplicity, such as controllers, buffers (caches), drivers, repeaters, and receivers, to enable communications. Further, the local interface 512 may include address, control, and/or data connections to enable appropriate communications among the aforementioned components.

The processor 502 is a hardware device for executing software, particularly that stored in the memory 506. The processor 502 can be any custom made or commercially available single core or multi-core processor, a central processing unit (CPU), an auxiliary processor among several processors associated with the present system 500, a semiconductor based microprocessor (in the form of a microchip or chip set), a macroprocessor, or generally any device for executing software instructions.

The memory 506 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 506 may incorporate electronic, magnetic, optical, and/or other types of storage media. Note that the memory 506 can have a distributed architecture, where various components are situated remotely from one another, but can be accessed by the processor 502.

The software 508 defines functionality performed by the system 500, in accordance with the present invention. The software 508 in the memory 506 may include one or more separate programs, each of which contains an ordered listing of executable instructions for implementing logical functions of the system 500, as described below. The memory 506 may contain an operating system (O/S) 520. The operating system essentially controls the execution of programs within the system 500 and provides scheduling, input-output control, file and data management, memory management, and communication control and related services.

The I/O devices 510 may include input devices, for example but not limited to, a keyboard, mouse, scanner, microphone, etc. Furthermore, the I/O devices 510 may also include output devices, for example but not limited to, a printer, display, etc. Finally, the I/O devices 510 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the system 500 is in operation, the processor 502 is configured to execute the software 508 stored within the memory 506, to communicate data to and from the memory 506, and to generally control operations of the system 500 pursuant to the software 508, as explained above.

When the functionality of the system 500 is in operation, the processor 502 is configured to execute the software 508 stored within the memory 506, to communicate data to and from the memory 506, and to generally control operations of the system 500 pursuant to the software 508. The operating system 520 is read by the processor 502, perhaps buffered within the processor 502, and then executed.

When the system 500 is implemented in software 508, it should be noted that instructions for implementing the system 500 can be stored on any computer-readable medium for use by or in connection with any computer-related device, system, or method. Such a computer-readable medium may, in some embodiments, correspond to either or both the memory 506 or the storage device 504. In the context of this document, a computer-readable medium is an electronic, magnetic, optical, or other physical device or means that can contain or store a computer program for use by or in connection with a computer-related device, system, or method. Instructions for implementing the system can be embodied in any computer-readable medium for use by or in connection with the processor or other such instruction execution system, apparatus, or device. Although the processor 502 has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor or other such instruction execution system, apparatus, or device.

Such a computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted, or otherwise processed in a suitable manner if necessary, and then stored in a computer memory.

In an alternative embodiment, where the system 500 is implemented in hardware, the system 500 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Under the present embodiments, a long-running process encapsulates a native binary DLL. The long-running process has a named pipe input that provides a communication path between a native messaging application and the native binary DLL. The method and system are directed to the practical application of providing a web application access to the native binary DLL.

The present embodiments improve the functionality of a general purpose computer by providing a previously unavailable communication conduit between a web application and a local binary DLL. This expands the scope of the web application, while still maintaining privacy and autonomy of the local machine, as the local machine has control over the creation of and/or access to the named pipe that bridges the binary DLL with the browser extension.

While the above embodiments have been drawn to a DLL that receives and processes high band width video data, the invention is applicable to other computationally intensive local processes where the local machine does the heavy computational lifting, while the web application may provide parameters for guiding the computationally intensive process, and occasionally check (for example, periodically polling) the computationally intensive process regarding its status.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A system for providing a web application access to a native binary dynamic link library (DLL) executed on a host computing device, comprising;
    the web application running on the host computing device in communication with a remote server;
    a browser extension to the web application;
    a native messaging application running on the host computing device configured to communicate with the browser extension via standard input/output (STD IO) provided by an operating system of the host computing device;
    the native binary DLL comprising executable instructions configured to be executed by the host computing device; and
    a long-running computational process on the host computing device configured as a DLL wrapper for the native binary DLL,
    wherein the native messaging application and the long-running computational process are configured to communicate with one another via a named pipe, and the long-running computational process has a second duration independent of a first duration of the native messaging application.

2. The system of claim 1, further comprising a peripheral device in communication with the native binary DLL.

3. The system of claim 2, wherein the peripheral device comprises a camera.

4. The system of claim 1, wherein the long-running computational process comprises a Windows service.

5. A method for initializing a system establishing communication between a web application and a native binary dynamic link library (DLL) running on a host computing device, comprising the steps of:
    sending initialization data to a browser extension running on the host computing device;
    launching a native messaging application on the host computing device by the browser extension;
    sending the initialization data to the native messaging application via standard input output means (STD IO) provided by an operating system of the host computing device;
    the native messaging application launching and/or connecting to a long-running computational process containing the native binary DLL;
    sending the initialization data to the long-running computational process via a named pipe,
    wherein the native binary DLL is configured to perform a computationally intensive processing on the host computing device.

6. The method of claim 5 further comprising the step of initializing the named pipe.

7. The method of claim 5 further comprising the step of connecting to the named pipe.

8. The method of claim 5, further comprising the step of the long-running computational process providing initialization data to the native binary DLL.

9. The method of claim 5 further comprising the step of the long-running process initializing and connecting to a local resource.

10. The method of claim 9, wherein the local resource comprises a camera, wherein the local resource comprises a peripheral device connected to the host computing device.

11. A method for establishing a communication conduit between a web application and a native binary dynamic link library (DLL) running on a host computing device, comprising the steps of:
    sending by the web application to a browser extension a request for data, wherein an end recipient of the request for data comprises a long-running computational process containing the native binary DLL running on the host computing device;
    via standard input/output (STD IO) provided by an operating system of the host computing device, the browser extension forwarding the data request to a native messaging application process; and
    the native messaging application forwarding the request to the long running computational process via a named pipe.

12. The method of claim 11, further comprising the steps of:
    the long-running computational process sending a message for the web application to the native messaging application via the named pipe;
    the native messaging application forwarding the message for the web application to the browser extension via the STD IO; and
    the browser extension forwarding the message to the web application.

13. The method of claim 12, wherein the message for the web application comprises one or more of the group consisting of status data, result data, and request response data.

* * * * *